(12) United States Patent
Rouhana et al.

(10) Patent No.: US 8,087,714 B2
(45) Date of Patent: Jan. 3, 2012

(54) VEHICLE STRUCTURAL REINFORCEMENT SYSTEM

(75) Inventors: Stephen William Rouhana, Plymouth, MI (US); Krish E. Aekbote, Farmington Hills, MI (US); Mohamed Ridha Baccouche, Ann Arbor, MI (US)

(73) Assignee: Ford Global Technologies, LLC, Dearbor, MI (US)

( * ) Notice: Subject to any disclaimer, the term of this patent is extended or adjusted under 35 U.S.C. 154(b) by 0 days.

(21) Appl. No.: 12/722,520

(22) Filed: Mar. 11, 2010

(65) Prior Publication Data

US 2011/0221229 A1   Sep. 15, 2011

(51) Int. Cl.
*B60J 5/00* (2006.01)

(52) U.S. Cl. ................. 296/146.6; 296/187.12

(58) Field of Classification Search ............ 296/146.6, 296/187.12
See application file for complete search history.

(56) References Cited

U.S. PATENT DOCUMENTS

| | | | |
|---|---|---|---|
| 5,224,752 A * | 7/1993 | Marshall | 296/146.1 |
| 5,314,228 A | 5/1994 | Figge, Sr. | |
| 5,806,917 A * | 9/1998 | Townsend | 296/202 |
| 6,053,565 A * | 4/2000 | Cho | 296/187.12 |
| 6,196,619 B1 | 3/2001 | Townsend et al. | |
| 6,312,045 B2 * | 11/2001 | Kitagawa | 296/187.12 |
| 6,601,910 B1 * | 8/2003 | Duggan | 296/203.03 |
| 6,877,796 B2 | 4/2005 | Kimura | |
| 7,311,169 B1 * | 12/2007 | Caliskan et al. | 180/274 |
| 7,441,826 B2 | 10/2008 | Frank | |
| 7,735,901 B2 * | 6/2010 | Melz et al. | 296/146.6 |
| 2002/0093219 A1 | 7/2002 | Traister et al. | |
| 2005/0093278 A1 * | 5/2005 | Wehner et al. | 280/735 |

OTHER PUBLICATIONS

Kim Heon Young, et al., A Study on the Hybrid Finite Element Modeling for Side Impact Simulation, Society of Automotive Engineers, Inc., Warrendale, Pennsylvania, USA, Sep. 1, 1999.
Hedeen & Campbell, Side Impact Structures Society of Automotive Engineers, Inc. Warrendale, Pennsylvania, USA, Feb. 1, 1969.
Kelkar et al., Robust design of a tubular door intrusion beam, Society of Automotive Engineers, Inc., Warrendale, Pennsylvania, USA, Oct. 1, 1995.
John Haynes, Development and Analysis of Door Side-Impact Reinforcements; Society of Automotive Engineers, Inc., Warrendale, Pennsylvania, USA, Jan. 1, 1972.
Dazhi Wang et al., Car Side Structure Crashworthiness in Pole and Moving Deformable Barrier Side Impacts, Science Direct, Nov. 25, 2006.
Deng et al., Math-based performance evaluation of an experimental car—Side impact protection, Compendex, Oct. 2, 2002.

* cited by examiner

*Primary Examiner* — Dennis Pedder
(74) *Attorney, Agent, or Firm* — Fredrick V. Owens; Just Intellectuals, PLLC

(57) ABSTRACT

The present disclosure relates to various vehicle structural reinforcement systems and methods of manufacturing the same. A latching system is included in the vehicle to mechanically link two vehicle structural members under preselected conditions.

14 Claims, 7 Drawing Sheets

VEHICLE STRUCTURAL REINFORCEMENT SYSTEM

TECHNICAL FIELD

The present disclosure relates to vehicle impact mitigation systems and related methods of manufacturing the same.

BACKGROUND

Impact mitigation continues to be an area of growth and development within the transportation industry. Conventional passenger vehicles can include various impact mitigation devices such as airbags, vehicle door reinforcement members, restraint modules, pretensioners, impact sensors, and air curtains. Some of these devices are aimed at improving the vehicle's structural rigidity in impact situations. Side impact is one area that can present a quagmire as the vehicle doors are less rigid since they need to be configured to connect and disconnect from the vehicle frame (i.e., open and close with respect to the vehicle frame).

Current side doors contain beams to help distribute the energy in side impact situations. While the beams may be tied into a hinge pillar at one end of the door, they are effectively cantilevered at the opposite end of the door. See e.g., U.S. Pat. No. 7,441,826 titled "Energy Transfer Beam for Automotive Side Door." This cantilevered arrangement can limit the role that the beams play in reducing deformation of the side door in side impact situations.

Some existing vehicles have sought to manage this issue by extending the beam between the vehicle A-pillar and B-pillar. For example, U.S. Pat. No. 6,196,619 titled "Vehicle Closure Panel Having an Intrusion Beam as Primary Structure" discusses a U-shaped beam with keys at each end designed to mate with receptacles formed in the A- and B-pillars. Likewise U.S. Pat. No. 5,314,228 titled "Vehicle Side Impact Intrusion Barrier" involves supports in each of the A- and B-pillars that enable a beam to move or rotate about the supports in a side impact situation. While each design seeks to reduce deformation in side impact situations, none of them provide as much structural rigidity as would locking or constraining a crossbeam with respect to both pillars.

Therefore, it is desirable to have a vehicle structural reinforcement system that enables a door crossbeam to be selectively secured into an A- or B-pillar when the door is closed yet unlatch for entrance in or exit out of the vehicle. Greater resistance against rotation of the crossbeam is further desirable to reduce overall deformation.

SUMMARY

The present inventions address one or more of the above-mentioned issues. Other features and/or advantages may become apparent from the description which follows.

One embodiment of the present invention involves a vehicle structural reinforcement system, including: a first pillar; a second pillar; a vehicle door between the first and second pillars; a first crossbeam attached to the door; and a first latching system configured to selectively lock the first crossbeam to the second pillar under a preselected condition. The first latching system comprise an anti-rotation device configured to reduce rotation of the first crossbeam with respect to a vertical axis.

Another exemplary embodiment of the present invention regards a vehicle structural reinforcement system, including: a pillar; a floor rocker attached to a vehicle floor; a crossbeam extending between the pillar and the floor rocker; and a latching system configured to selectively lock the crossbeam to the floor rocker. The latching system includes: and anti-rotation device configured to reduce rotation of the crossbeam with respect to a vertical axis.

Another exemplary embodiment of the present invention regards a method of manufacturing a vehicle structural reinforcement system, the method including: forming a first pillar; forming a second pillar; forming a crossbeam; attaching the crossbeam to a vehicle door; incorporating a latching system between the crossbeam and second pillar configured to selectively lock the crossbeam to the second pillar; configuring the latching system to activate under a preselected condition; and incorporating an anti-rotation device in the latching system, configured to reduce rotation of the crossbeam with respect to a vertical axis.

Another exemplary embodiment of the present invention involves a method of reinforcing a vehicle door. The steps of the method include: attaching a crossbeam to a vehicle door; incorporating a latching system between the crossbeam and second pillar configured to selectively lock the crossbeam to the second pillar; configuring the latching system to activate under preselected condition; and incorporating an anti-rotation device in the latching system, configured to reduce rotation of the crossbeam with respect to a vertical axis.

One advantage of the present disclosure is that it teaches a vehicle structural reinforcement system that enables a door crossbeam to be selectively secured into an A- or B-pillar when the door is closed yet unlatch when the vehicle door is open. The design improves structural rigidity in side impact situations.

Another advantage of the present disclosure is that it teaches a latching system that incorporates an anti-rotation device therein; the latching system provides greater resistance against rotation of the crossbeam to reduce overall deformation.

Another advantage of the present disclosure is that it involves reinforcement schemes that rely on preexisting vehicle structure for support in side impact situations in order to reduce the deformation at a given level of crash energy.

The present teachings reduce side door deformation and deformation velocity in side impact situation. The exemplary structural reinforcement systems reduce deformation and deformation velocity by tying the A- and B-pillars together in a 2-door vehicle, the A-, B-, and C-pillars together in a 4-door vehicle or the A-, B-, C-, and D-pillars together in larger vehicles. By tying the pillars together, the energy required to deflect a crossbeam in the doors significantly increases, and hence the energy required to cause deformation, will increase significantly. In one embodiment, an 8 inch deformation of the vehicle door in a lateral direction requires a normal force of at least 8,000 lbf (or pounds of force). This is compared to a 6,000 lbf normal force required to cause an 8 inch lateral deformation with existing vehicle door designs.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed descrip-

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Figure 1:
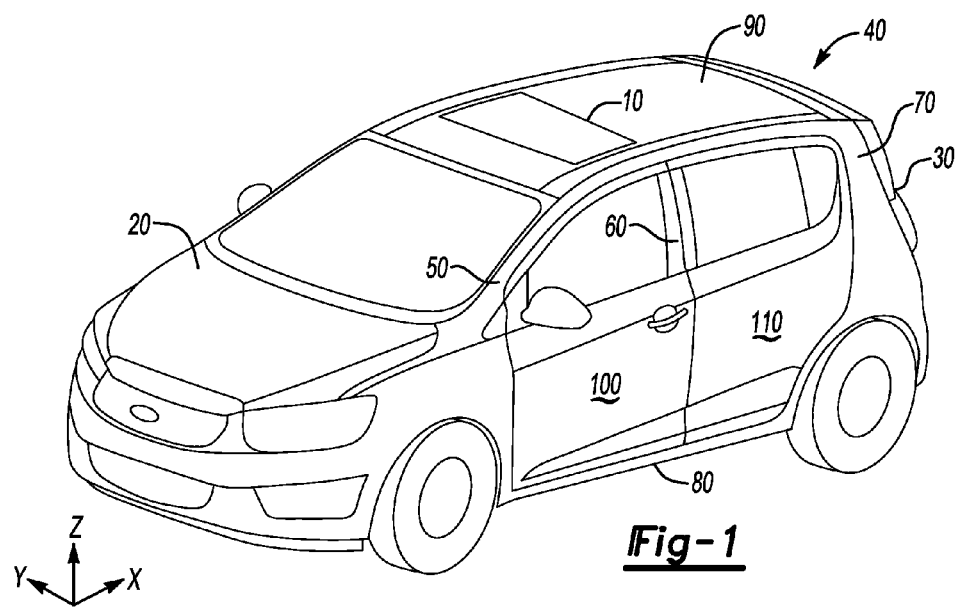
FIG. 1 is a perspective view of a vehicle compatible with a structural reinforcement system in accordance with an exemplary embodiment of the present invention.

Referring to the drawings, FIGS. 1-12, wherein like characters represent the same or corresponding parts throughout the several views there are shown exemplary vehicle structural reinforcement systems that mitigate vehicle deformation in an impact situation. Systems can be used in various types of vehicles including small/large cars, coupes, sedans, convertibles, trucks, vans, minivans, all utility vehicles and sports utility vehicles. In some embodiments, the vehicle structural reinforcement systems are used to provide additional structural reinforcement in side impact situations. Structural reinforcement systems include crossbeams that mechanically interlock two vehicle pillars (e.g., an A-pillar and B-pillar) under preselected conditions. Structural reinforcement members are not limited to applications with hinged vehicle doors, as illustrated, but can also be utilized with sliding doors. The present teachings are not limited to vehicle doors. Other embodiments of the present invention include application of the present teachings to different areas of the vehicle such as a sunroof 10, hood 20 or trunk 30 (as shown in FIG. 1).

Figure 2:
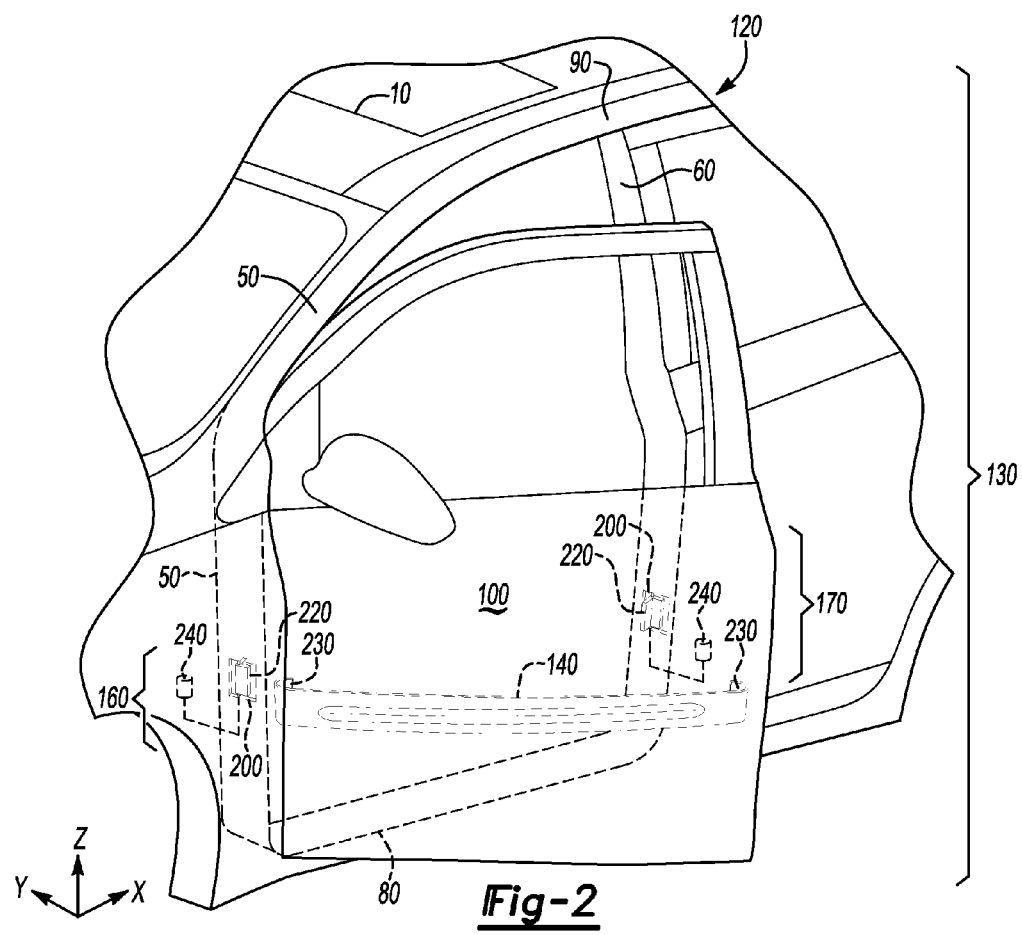
FIG. 2 is a perspective view of the vehicle door of FIG. 1 with an exemplary structural reinforcement system.

Referring now to FIG. 1, there is shown therein a perspective view of a vehicle 40 compatible with a vehicle structural reinforcement system according to an exemplary embodiment of the present invention. The structural reinforcement system is configured to mitigate deformation of the vehicle door in a side impact situation by mechanically linking the A-pillar 50 and B-pillar 60 together through a crossbeam (e.g., 140 as shown in FIG. 2). In the illustrated embodiment, the vehicle includes three vertically extending structural members or pillars: the A-pillar 50 at the front of the passenger cabin, B-pillar 60 behind the driver's seat, and a C pillar 70 disposed behind a rear passenger seat. In other embodiments, the vehicle also includes a fourth vertically extending structural member or a D pillar at the end of the vehicle. Vehicles with extended cabins can include more than four vertically extending structural members and still benefit from the present teachings.

As shown in FIG. 1, a Y-axis extends across the vehicle 40 from the driver side to the passenger side. An X-axis extends in the longitudinal direction of the vehicle 40, extending from the front end of the vehicle to the rear end of the vehicle. A Z-axis extends vertically across the vehicle 40, from the floor rocker 80 to the roof 90 of the vehicle. As shown in FIG. 1, a front door 100 is hinged to the A-pillar 50 and pivots with respect to the Z-axis. A rear door 110 is hinged to the B-pillar 60 and configured to pivot with respect to the Z-axis.

Referring now to FIG. 2, there is shown a perspective view of a side panel of the vehicle of FIG. 1 having two vehicle structural reinforcement systems (one of which is shown in detail). A vehicle side panel 120 includes the A-pillar 50, B-pillar 60 and C-pillar 70 (as shown in FIG. 1) that are permanently connected through the floor rocker 80 or floor board and a roof member 90. Structural reinforcement systems further integrate or mechanically link the A-pillar 50, B-pillar 60 and/or C-pillar 70. The structural reinforcement system 130 illustrated in FIG. 2 includes the A-pillar 50 and B-pillar 60 which are linked by a crossbeam 140 extending across a lower section of the vehicle side panel 120. The crossbeam 140 is compatible with vehicle door 100 so as to attach thereto. Crossbeam 140 can be attached to the door 100 using known methods such as a fastener, welding or forming techniques. A-pillar 50 includes a portion of a latching system 160 configured to selectively lock and positively engage the crossbeam 140 to the A-pillar 50 under preselected conditions. Once activated the latching system 160 is configured to secure or lock the crossbeam 140 in place with respect to the A-pillar 50. B-pillar 60 includes a portion of another latching system 170 configured to selectively lock and positively engage the crossbeam 140 of another end to the B-pillar 60, under preselected conditions. Once activated the latching system 170 is configured to secure or lock the crossbeam 140 in place with respect to the B-pillar 60.

Latching systems 160, 170 have certain preselected conditions for activating or locking the crossbeam 140 to the A-pillar 50 and B-pillar 60, respectively. Exemplary preselected conditions include the vehicle being in motion—reverse or forward—or the vehicle achieving a speed greater than a prescribed threshold. In one embodiment, the vehicle speed threshold is five miles per hour. In another embodiment, the vehicle speed threshold is 10 miles per hour. The latching systems 160, 170 are configured to remain active until the vehicle is placed in park or the vehicle speed reaches another prescribed lower limit (e.g., two miles per hour). Other preselected conditions for activating any of the latching systems discussed herein can be implemented with the present structural reinforcement systems; some of the preselected conditions are discussed with respect to FIG. 12.

Figure 3:
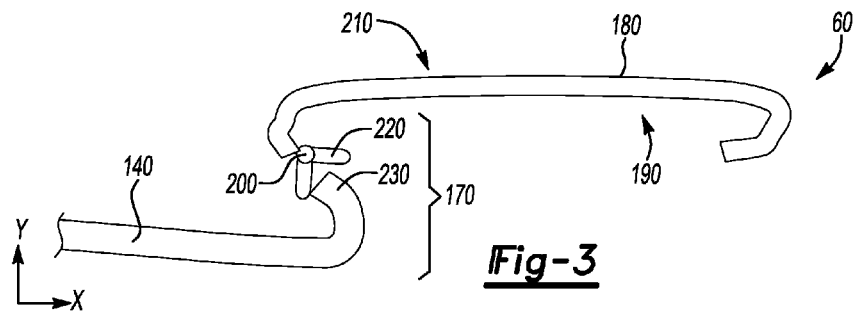
FIG. 3 is a top view of the latching system of FIG. 2, with vehicle door ajar.
Figure 4:
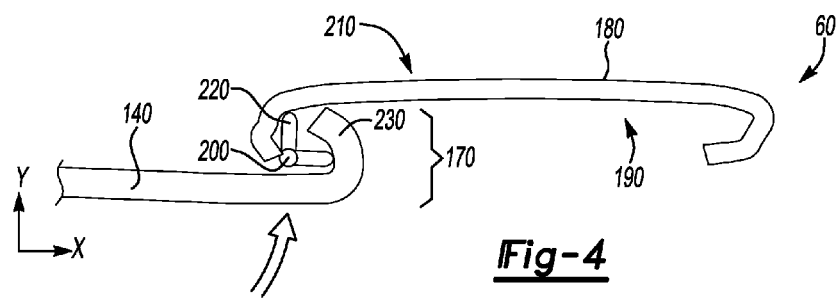
FIG. 4 is a top view of the latching system of FIG. 2, with vehicle door closed.

Referring to FIGS. 3-4, there is shown therein a top cross-sectional view of the B-pillar 60 with latching system 170 of FIG. 2. A pillar reinforcement ring 180 is included in the B-pillar 60, as shown in FIG. 3. The reinforcement ring 180 is a formed sheet of metal (e.g., steel or aluminum alloy) that abuts the passenger compartment of the vehicle 40. Reinforcement ring 180 has a concave profile when viewed from the top-down cross-sectional view shown. The cavity 190 of the ring 180 is positioned away from the vehicle passenger compartment.

The reinforcement ring 180 includes a locking hinge 200, as shown in FIGS. 3 and 4. Hinge 200 is attached to the ring 180 at an end most proximate to the reinforced door. In this example, the locking hinge 200 is located at a frontward end of the reinforcement ring 210 so as to reinforce the driver side door (100 as shown in FIG. 1). Locking hinge 200 includes a rotatable interface 220 configured to pivot between an unlocked position—as shown in FIG. 3—and a locked position—as shown in FIG. 4. The rotatable interface 220 includes two sides, perpendicularly positioned, that extend vertically with respect to the vehicle. The sides are configured at a 90 degree angle so as to fit a portion of a hooked end 230 of the crossbeam 140 between the sides when the interface 220 is rotated into a locked position (as shown in FIG. 4). The sides of the rotatable interface 220 can be positioned at an angle less than or greater than 90 degrees. As shown in FIGS. 3 and 4, when in the locked position, the hinge 200 secures the hooked end 230 of the crossbeam 140 thereto. In this embodiment, the hooked end 230 is configured to engage the locking hinge 200 when the vehicle door 100 (of FIG. 1) is closed. In this manner, hooked end 230, as shown in FIGS. 3-4, is matable with the locking hinge 200. Locking hinge 200 reduces deformation of the crossbeam 140 in the lateral direction (or along the Y-axis).

Locking hinge 200 also reduces rotation of the crossbeam 140 with respect to the vertical axis of the vehicle (or the Z-axis as shown in FIG. 1). Locking hinge 200 is an anti-rotation device. The fit between the interface surface 220 and the hook end 230 of the crossbeam 140 influence the rotation the crossbeam will demonstrate when a significant normal force is applied against the crossbeam. In the embodiment shown in FIGS. 3-4, hooked end 230 is configured to slightly nest between the B-pillar reinforcement ring 180 and the interface surface 220. In other embodiments, the interface surface 220 and crossbeam 140 have a more snug connection thereby enabling less movement of the crossbeam. Different matable connecting schemes can be implemented in the locking hinge 200 and crossbeam 140 to lock the crossbeam to the vehicle pillar.

As illustrated, the latching system 170 has an active and inactive state. In the embodiment shown in FIGS. 2-4, the inactive state of the latching system 170 occurs when the locking hinge 200 is in an unlocked position (as shown in FIG. 3) and the active state occurs when the locking hinge 200 is in the locked position (as shown in FIG. 4). Locking hinge 200 is coupled to a rotary actuator 240 in FIG. 2. The actuator 240 pivots the locking hinge 200 between the unlocked and locked positions. When the vehicle door 100, of FIG. 1, is ready to open the actuator 240 (as shown in FIG. 2) pivots the locking hinge 200 into the unlocked position and releases the crossbeam 140. Various latching systems are compatible with structural reinforcement system 130 shown in FIG. 2 including mechanically or hydraulically actuated systems.

Locking hinge 200 can be attached to the reinforcement ring 180 through welds or screws or other known attachment mechanisms. A mounting bracket can be included in the reinforcement system 130 to distribute the bending arm caused by side impact across a larger cross-section of the B-pillar reinforcement ring 180. The pillar reinforcement ring 180 shown in FIGS. 3 and 4 is an exemplary ring and can be a reinforcement ring in any one of the A-pillar 50, B-pillar 60, C-pillar 70, D-pillar, floor rocker 80—as shown in FIG. 1—or any other vehicle structural member. The connections to the pillars (or other structural members) may require local reinforcement of the pillars and should be coupled with further pillar structural tie-ins with the rest of the vehicle structure. By locking the crossbeam 140 into the A- and B-pillar the vehicle structural reinforcement system 130 recruits much of the vehicle structure to mitigate side impact, thereby reducing the deformation at a given level of energy.

Another latching system (not shown) is included with the additional structural reinforcement system. This latching system locks another crossbeam (similar to 140 of FIG. 2) with respect to the vehicle C-pillar 70. Crossbeam is configured to be included in a rear passenger door 110 as shown in FIG. 1. When the door 110 is closed the crossbeam is securely coupled to the B-pillar 60 and C-pillar 70 by the latching systems.

Figure 5:
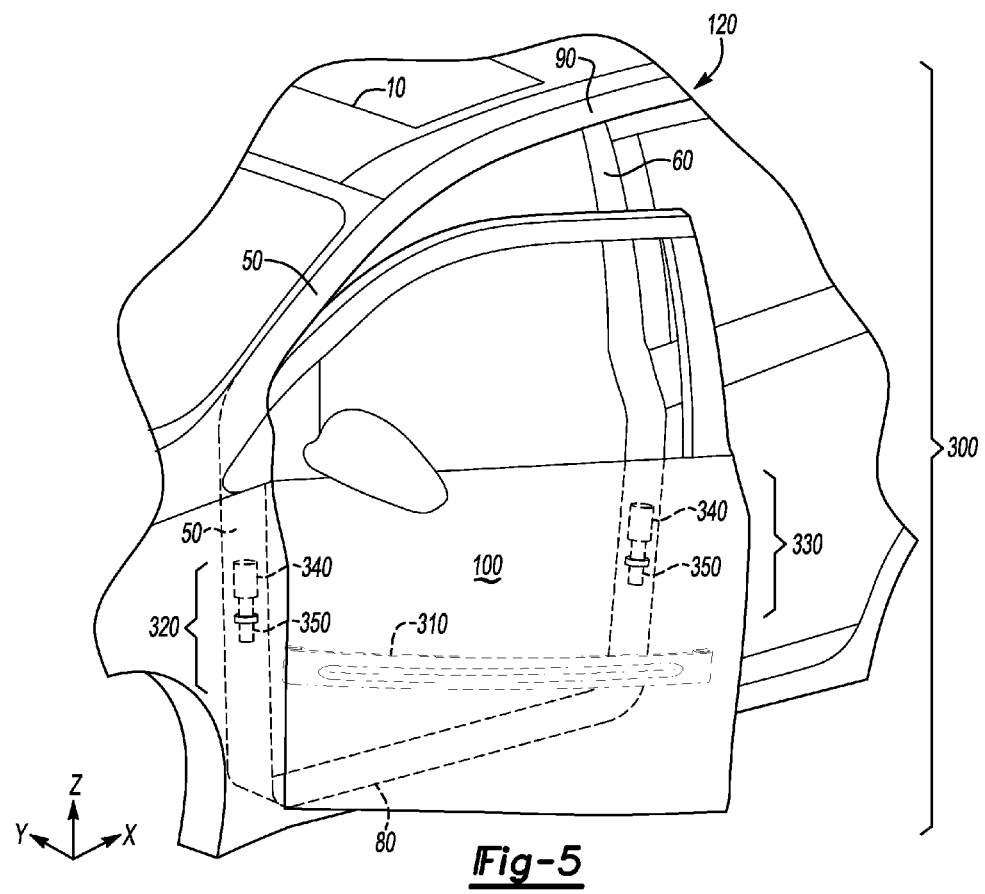
FIG. 5 is a perspective view of the vehicle door of FIG. 1 with another exemplary structural reinforcement system.

Referring now to FIG. 5, there is shown a perspective view of the side panel 120 of the vehicle 40 (of FIG. 1) having another vehicle structural reinforcement system 300 in accordance with an exemplary embodiment. The side panel 120 includes the A-pillar 50, B-pillar 60 and C-pillar 70 (as shown in FIG. 1) that are connected through the floor rocker 80 and roof member 90.

The structural reinforcement system 300, as shown in FIG. 5, includes the A-pillar 50 and B-pillar 60 which are linked by a crossbeam 310 extending across a lower section of the vehicle side panel 120. The crossbeam 310 is compatible with vehicle door 100 and attaches thereto. A-pillar 50 includes a portion of a latching system 320 configured to selectively lock the crossbeam 310 to the A-pillar under preselected conditions. Once activated the latching 320 system is configured to secure the crossbeam 310 in place with respect to the A-pillar 50. Latching system 320 has certain preselected conditions for activating or locking the crossbeam 310 to the A-pillar 50. Another latching system 330 is included in the vehicle. In this embodiment, latching system 330 is substantially similar to latching system 320 except latching system 330 connects a rearward end of the crossbeam to the B-pillar 60. The B-pillar 60 includes a portion of a latching system 330 configured to selectively lock the crossbeam 310 to the B-pillar 60 under preselected conditions. Once activated the latching system 330 is configured to secure the crossbeam in place with respect to the B-pillar. Latching system 330 has certain preselected conditions for activating or locking the crossbeam 310 to the B-pillar 60. In FIG. 2, the driver door 100 is ajar and in an unlocked position.

An actuator 340 is included in the latching systems 320, 330, as shown in FIG. 5. Actuators 340 are linear actuators configured to move a pin 350 vertically, or along the Z-axis. For example, actuator 340 can be of a drive screw or a solenoid arrangement. When the latching systems 320, 330 are activated, the actuator 340 is instructed to move the pin 350 into engagement with the crossbeam 310.

Figure 6:
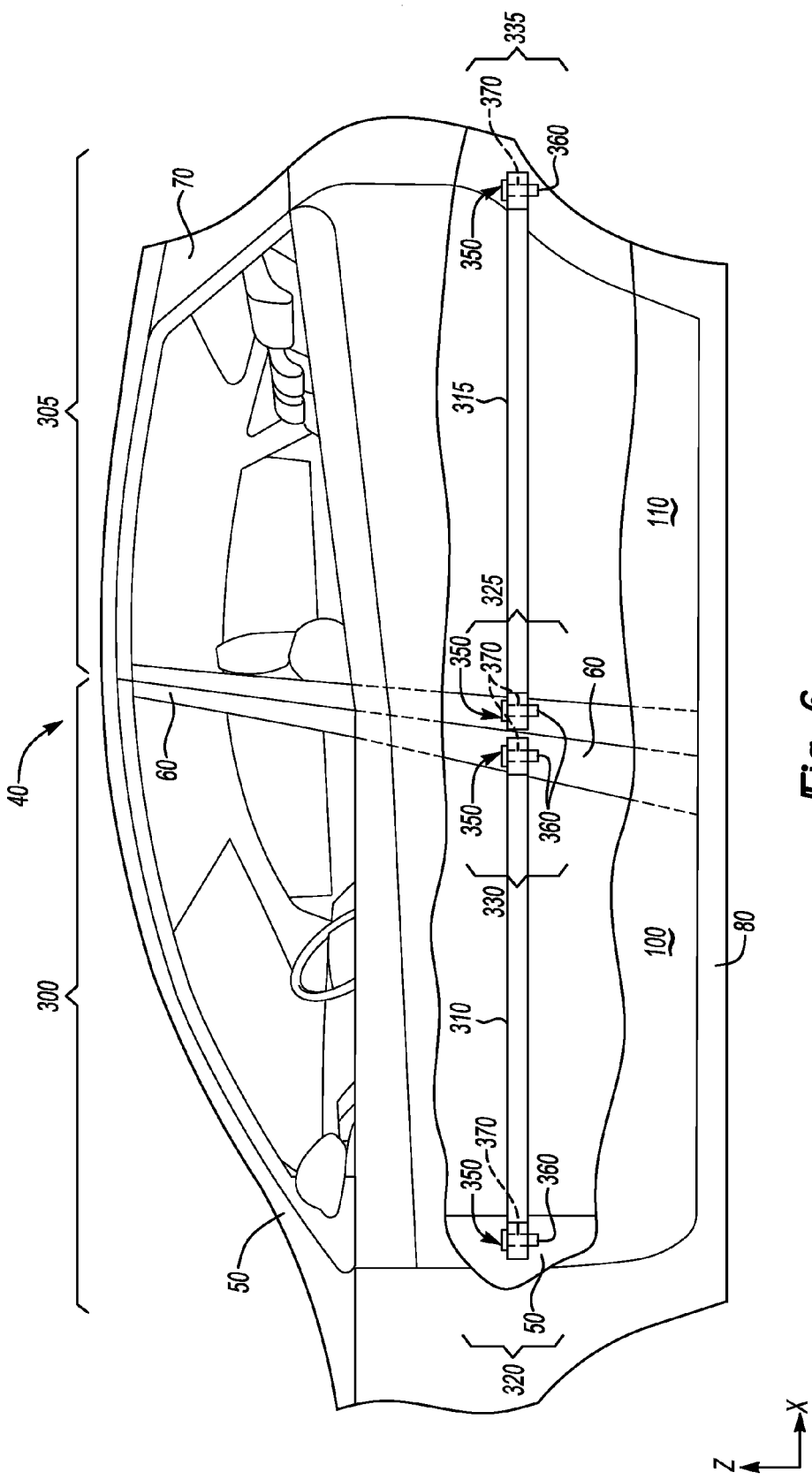
FIG. 6 is a side view of the vehicle and latching system of FIG. 5.

Referring to FIG. 6, there is shown therein the structural reinforcement system 300 of FIG. 5 in an active position or state. Illustrated is a side view of the vehicle 40 with the driver door 100 and driver side passenger door 110 closed. When the door 100 is closed the crossbeam 310 extends along the longitudinal axis of the vehicle (or the X-axis). The driver side door 100 is shown with a partial cut-away showing inside the door skin or sheet metal. The movable pins 350 are shown in an engaged position with respect to the crossbeam 310. The pin 350 includes a shaft 360 or prong that fits into an aperture 370 in the crossbeam 310.

Also shown in FIG. 6, there is another structural reinforcement system 305 in an active position or state. Driver side passenger door 110 is closed. When the door 110 is closed a crossbeam 315 extends along the longitudinal axis of the vehicle (or the X-axis). The driver side door 110 is shown with a partial cut-away showing inside the door skin or sheet metal. Two latching systems 325 and 335 are included in the reinforcement system 305 to link the crossbeam 315 to the B-pillar 60 and C-pillar 70, respectively. The movable pins 350 are shown in an engaged position with respect to the crossbeam 315. The pin 350 includes a shaft 360 or prong that fits into an aperture 370 in the crossbeam 315. As illustrated, the vehicle pillars 50, 60 and 70 are integrated so as to bolster the structural integrity of the vehicle 40 in side impact situations.

Figure 7:
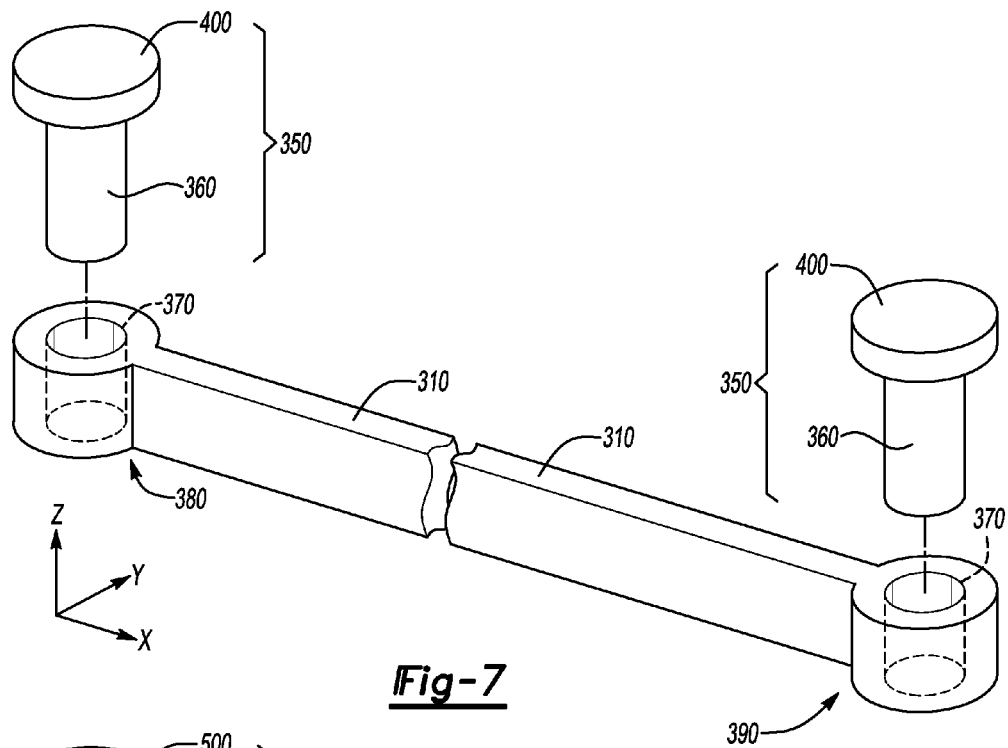
FIG. 7 is a perspective view of the crossbeam and pin of the structural reinforcement system of FIG. 5.

Referring now to FIG. 7, the crossbeam 310 and pin 350 engagement are shown in isolation. FIG. 7 shows a perspective view of the crossbeam 310 of FIGS. 5-6 with movable pins 350 disengaged from the crossbeam. Since the illustrated crossbeam 310 is configured to lock into two structural pillars (A- and B-pillars 50 and 60, respectively) the crossbeam accordingly includes two 370 apertures formed in the beam. A forward receiving end 380 is configured to attach to the A-pillar 50—shown in FIG. 6—when engaged with the movable pin 350. Shaft 360 fits in the aperture 370 when the latching system 320 is active. The pin 350 can include a flat head 400 (as shown) that can assist in interfacing the actuator 340. The rearward receiving end 390 of the crossbeam 310 is configured to attach to the B-pillar 60 when engaged with the movable pin 350. Shaft 360 fits in the aperture 370 when the latching system 330 is active. Pins 350 can also have a different shape than shown such as, for example, an elliptical or hexagon shaped head.

Figure 8:
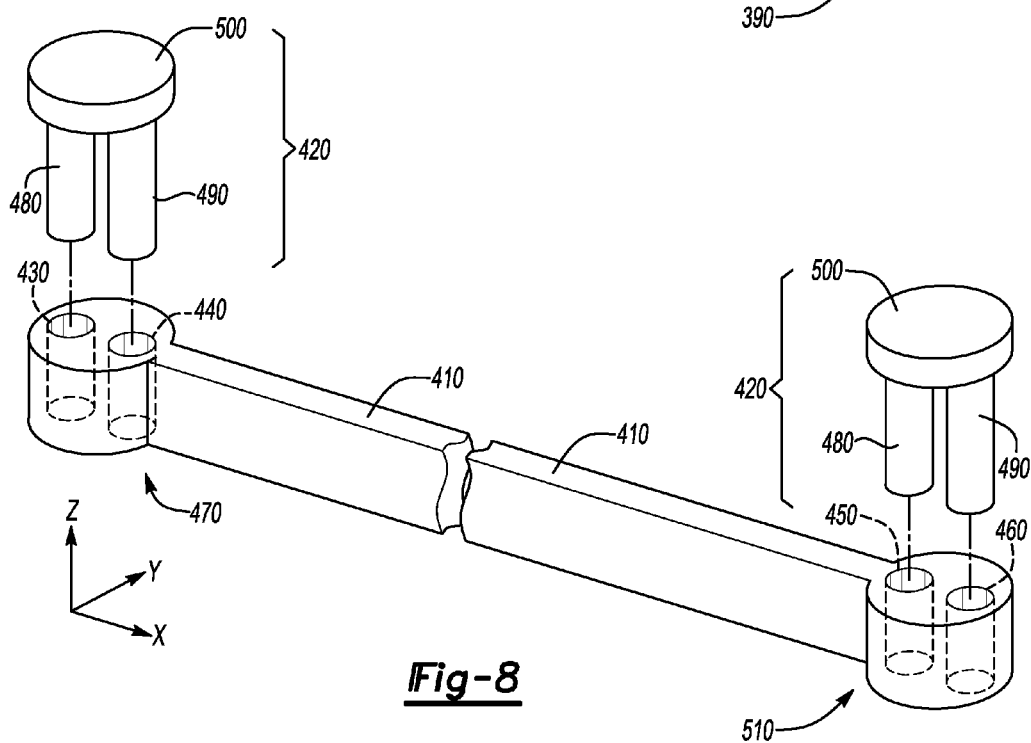
FIG. 8 is a perspective view of another crossbeam and pin compatible with the structural reinforcement system of FIG. 5.

In FIG. 8, there is another exemplary crossbeam 410 and pin 420 that would be compatible with the structural reinforcement system 300 shown in FIGS. 5-6. The crossbeam 410 and pin 420 engagement are shown in isolation in FIG. 8 which is a perspective view of the crossbeam with movable pins disengaged therefrom. The illustrated crossbeam 410 is configured to lock into two structural pillars (e.g., the A- and B-pillars 50 and 60 of FIG. 6, respectively) and the crossbeam includes four apertures 430, 440, 450 and 460 formed in the beam. A forward receiving end 470 is configured to attach to the A-pillar 50 when engaged with the movable pin 420. Each pin 420 includes two prongs e.g., 480, 490 or shafts. Shaft 480 fits in aperture 430 and shaft 490 fits in aperture 440. The pin 420 and shafts 480, 490 move into engagement with the crossbeam 410 when the latching system 320, as shown in FIG. 5, is active. The pin 420 can include a flat head 500 that can assist in interfacing the actuator 340. The rearward receiving end 510 is configured to attach to the B-pillar 60 (as shown in FIG. 6) when engaged with the movable pin 420. Shaft 480 fits in the aperture 450 and shaft 490 in aperture 460 when the latching system 330 is active.

Figure 9:
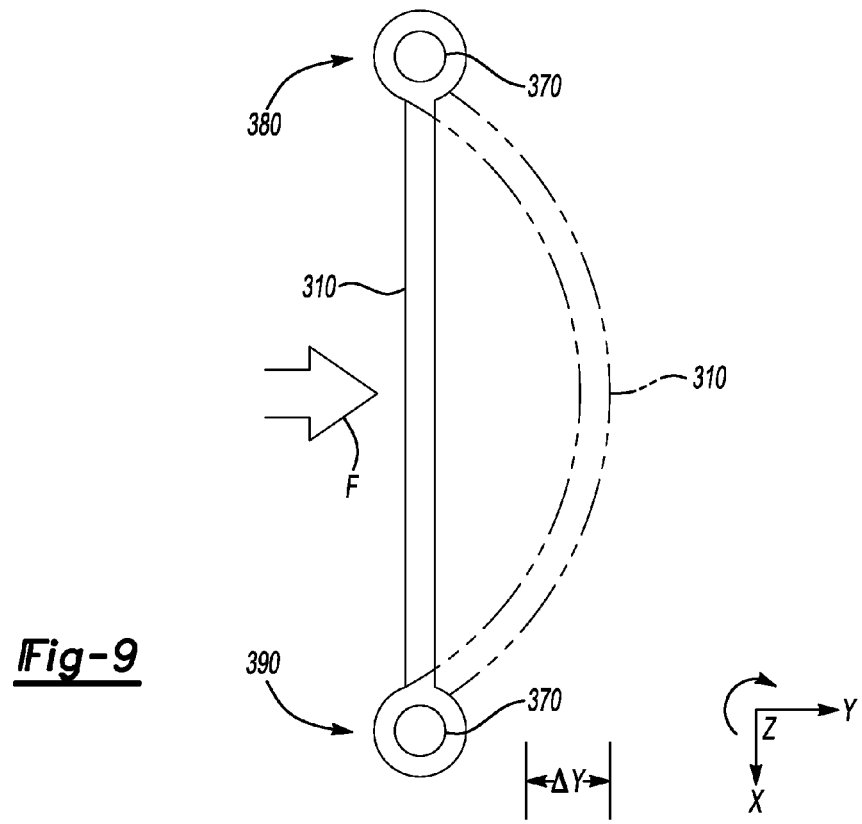
FIG. 9 is a top view of the crossbeam of FIG. 7 with broken lines representing the crossbeam in a side impact situation.
Figure 10:
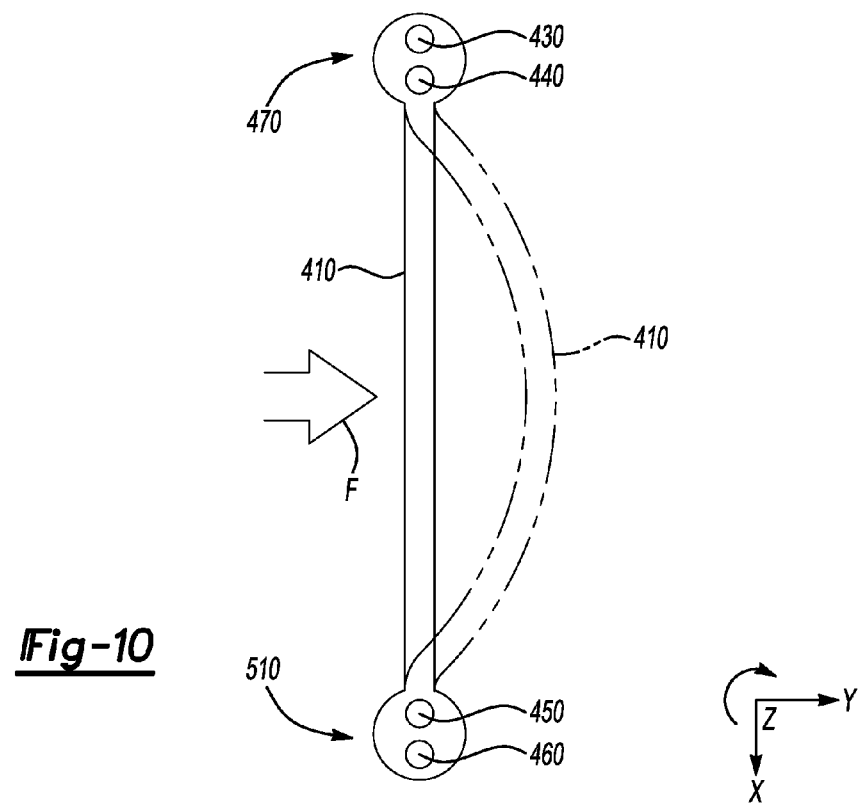
FIG. 10 is a top view of the crossbeam of FIG. 8 with broken lines representing the crossbeam in a side impact situation.

The dual prong arrangement of the pin 420, shown in FIG. 8, substantially reduces rotation of the crossbeam 410 with respect to a vertical axis of the vehicle (or the Z-axis). Pins 420 are anti-rotation devices. The dual prongs (e.g., shafts 480 and 490) act as an anti-rotation device. The reduced rotation of the crossbeam 410 yields less deformation with respect to the lateral axis of the vehicle (or the Y-axis). As shown in FIGS. 9 and 10 there are two top down views of the crossbeam 310 and 410 profiles of FIGS. 7 and 8, respectively. An equal lateral force, "F", is applied to each crossbeam 310 and 410. The crossbeams 310 and 410 are composed of the same material (e.g., a steel or aluminum alloy). Crossbeam 310 results in a substantially uniform deformation profile. Crossbeam 410 has a varied displacement profile with significantly less deformation at the ends 470 and 510 of the crossbeam 410. The anti-rotation device 420 effectuates a non-uniform deformation profile and results in a smaller displacement (e.g., $\Delta Y$ as shown in FIG. 9). The displacement differential, $\Delta Y$, can be as great as 7 inches for example. When applying an equal lateral force of 8,000 lbf the crossbeam 410 deforms 8 inches while a vehicle door not having the discussed structural reinforcement system deforms as much as 14 inches. In this embodiment, an 8 inch deformation of the vehicle door in a lateral direction requires a normal force of at least 8,000 lbf as compared to a 6,000 lbf normal force required to cause an 8 inch lateral deformation with some existing vehicle door designs.

Figure 11:
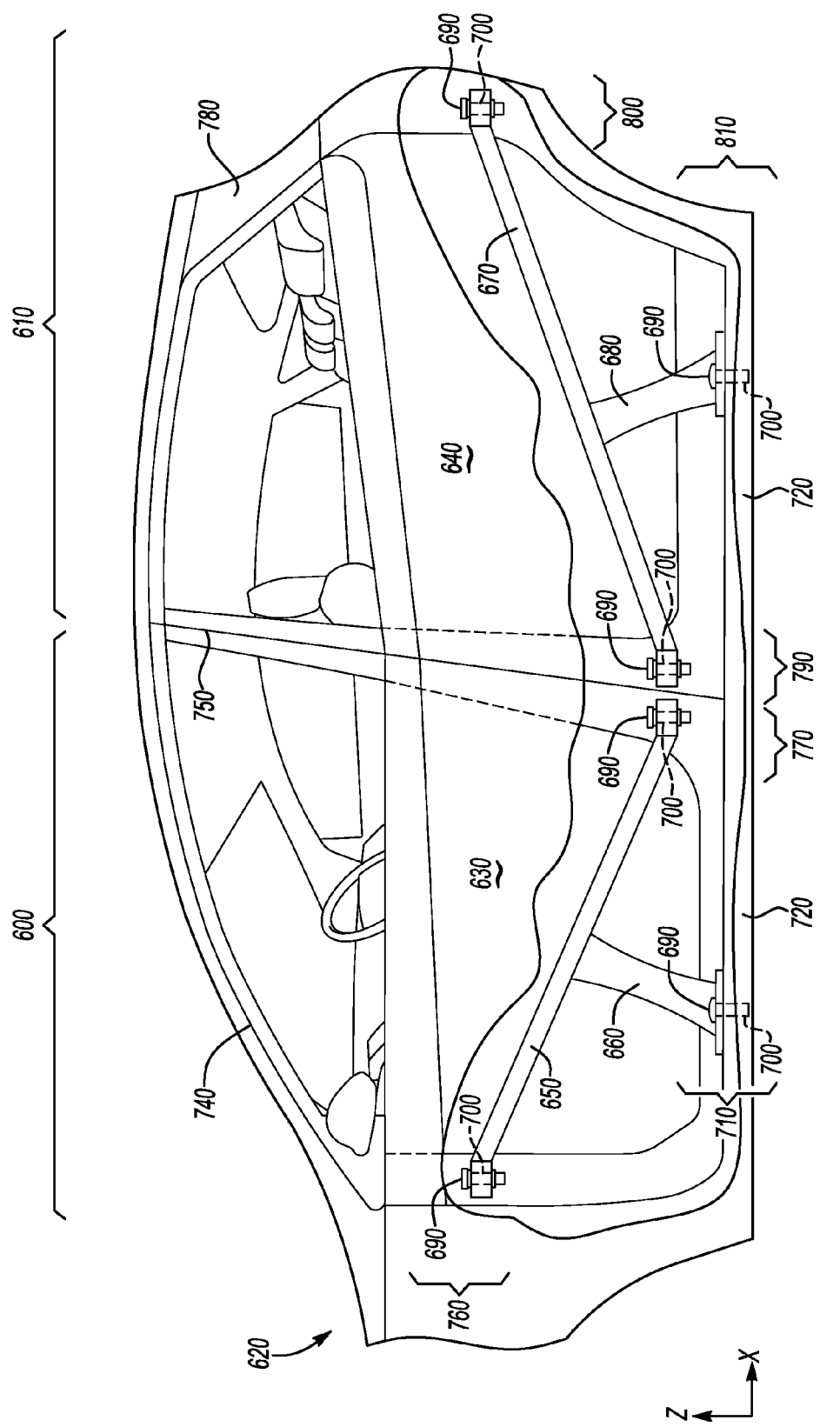
FIG. 11 is a side view of a vehicle with a structural reinforcement system according to another exemplary embodiment of the present invention.

Referring now to FIG. 11, there are two exemplary vehicle structural reinforcement systems 600, 610 shown in an active position or state. Illustrated is a side view of a vehicle 620 with the driver door 630 and driver side passenger door 640 closed. When the doors 630, 640 are closed crossbeams 650, 660, 670 and 680 extend angularly, traversing the longitudinal axis of the vehicle 620 (or the X-axis) as well as the vertical axis of the vehicle (or the Z-axis). The driver side door 630 is shown with a partial cut-away revealing inside the door skin or sheet metal. Movable pins 690 are shown in engaged positions with respect to the crossbeams 650, 660, 670 and 680. Pins 690 are linked to linear actuators (e.g., 340 as shown in FIG. 5) which positions pins in and out of engagement with the crossbeams 650, 660, 670 and 680. Each crossbeam 650, 660, 670 and 680 includes an aperture 700 configured to receive the shaft of the pin 690 therein.

The structural reinforcement system 600 includes crossbeam 660 that is attached to crossbeam 650, as shown in FIG. 11. Crossbeam 660 extends perpendicularly downward with respect to crossbeam 650. Crossbeam 660 can extend at an angle greater than or less than 90 degrees with respect to crossbeam 650. The vehicle includes a latching system 710 configured to selectively lock the crossbeam 650 in or to the floor rocker 720. Crossbeam 660 includes an aperture 700 through which a pin 690 can be fitted. Crossbeam 660 is configured to lock into the floor rocker 720.

The structural reinforcement system 600, as shown in FIG. 11, includes the floor rocker 720, an A-pillar 740 and B-pillar 750 which are linked by crossbeam 650 extending across a lower section of the vehicle 620. The vehicle floor rocker 720 is coupled to the A- and B-pillars 740, 750 through crossbeam 650. Crossbeams 650, 660 are compatible with the vehicle door 630 and attached thereto. A-pillar 740 includes a portion of the latching system 760 configured to selectively lock the crossbeam 650 to the A-pillar 740 under preselected conditions. Once activated the latching system 760 is configured to secure the crossbeam 650 in place with respect to the A-pillar 740. Latching system 760 has certain preselected conditions for activating or locking the crossbeam 650 to the A-pillar 740. Latching system 770 is also included in the vehicle 620. In this embodiment, latching system 770 is substantially similar to latching system 760 except latching system 770 connects a rearward end of the crossbeam 650 to the B-pillar 750. The B-pillar 750 includes a portion of the latching system 770 configured to selectively lock the crossbeam 650 to the B-pillar under preselected conditions.

The vehicle 620, shown in FIG. 11, includes a second structural reinforcement system 610. The structural reinforcement system 610 includes the B-pillar 750 and C-pillar 780 which are linked by a crossbeam 670 extending across a lower section of the vehicle 620 as well as the vehicle floor rocker 720 which is coupled to the B- and C-pillars 750 and 780 through crossbeams 670 and 680. Crossbeams 670 and 680 are compatible with the vehicle door 640 and are attached thereto. B-pillar 750 includes a portion of a latching system 790 configured to selectively lock the crossbeam 670 to the B-pillar 750 under preselected conditions. Once activated, the latching system 790 is configured to secure the crossbeam 670 in place with respect to the B-pillar 750. Latching system 790 has certain preselected conditions for activating or locking the crossbeam 670 to the B-pillar 670. Latching system 800 is also included in the vehicle 620. In this embodiment, latching system 800 is substantially similar to latching system 790 except latching system 800 connects a rearward end of the crossbeam 670 to the C-pillar 780. The C-pillar 780 includes a portion of the latching system 800. Under preselected conditions, once the reinforcement system is activated, the latching system 800 is configured to secure the crossbeam in place with respect to the C-pillar 780.

Latching system 810, as shown in FIG. 11, is also included in the vehicle to selectively lock the crossbeam 680 to the floor rocker 720. Crossbeam 680 extends perpendicularly downward with respect to crossbeam 670. Crossbeam 680 can extend at an angle greater than or less than 90 degrees with respect to crossbeam 670. In this embodiment, latching system 810 is substantially similar to latching system 790 except latching system secures the crossbeam 680 to the floor rocker 720. The floor rocker 720 includes a portion of the latching system 810 configured to selectively lock the crossbeam 680 to the floor rocker under preselected conditions. Once activated the latching system 810 is configured to secure the crossbeam 680 in place with respect to the floor rocker 720.

Latching systems 760, 710, 770, 790, 800 and 810 include actuators (not shown) configured to govern engagement of the pins 690 with the crossbeams 650, 660, 670 and 680. Actuators are configured to move pins 690 into engagement apertures in the crossbeams 650, 660, 670 and 680 when the latching systems 760, 710, 770, 790, 800 and 810 are activated. Actuators can be similar to actuator 240 or 340 as discussed with respect to FIGS. 2 and 5, respectively.

Other latching systems are compatible with the vehicle structural reinforcement systems 600 and 610 shown in FIG. 11. For example, the single shaft pins 690 used to engage the crossbeams 650, 660, 670 and 680 with the A-pillar 740, B-pillars 750, C-pillars 780 and/or floor rocker 720 can be a dual shaft attachment pins (e.g., 420 as shown in FIG. 8). Said pins thereby including an anti-rotation device such as shown and discussed with respect to FIGS. 8 and 10. The systems 600 and 610 can also be implemented with locking hinges (e.g., 200) attached to the A-, B- and C-pillars and/or floor rocker of a similar configuration to as discussed with respect to FIGS. 2-4.

Figure 12:
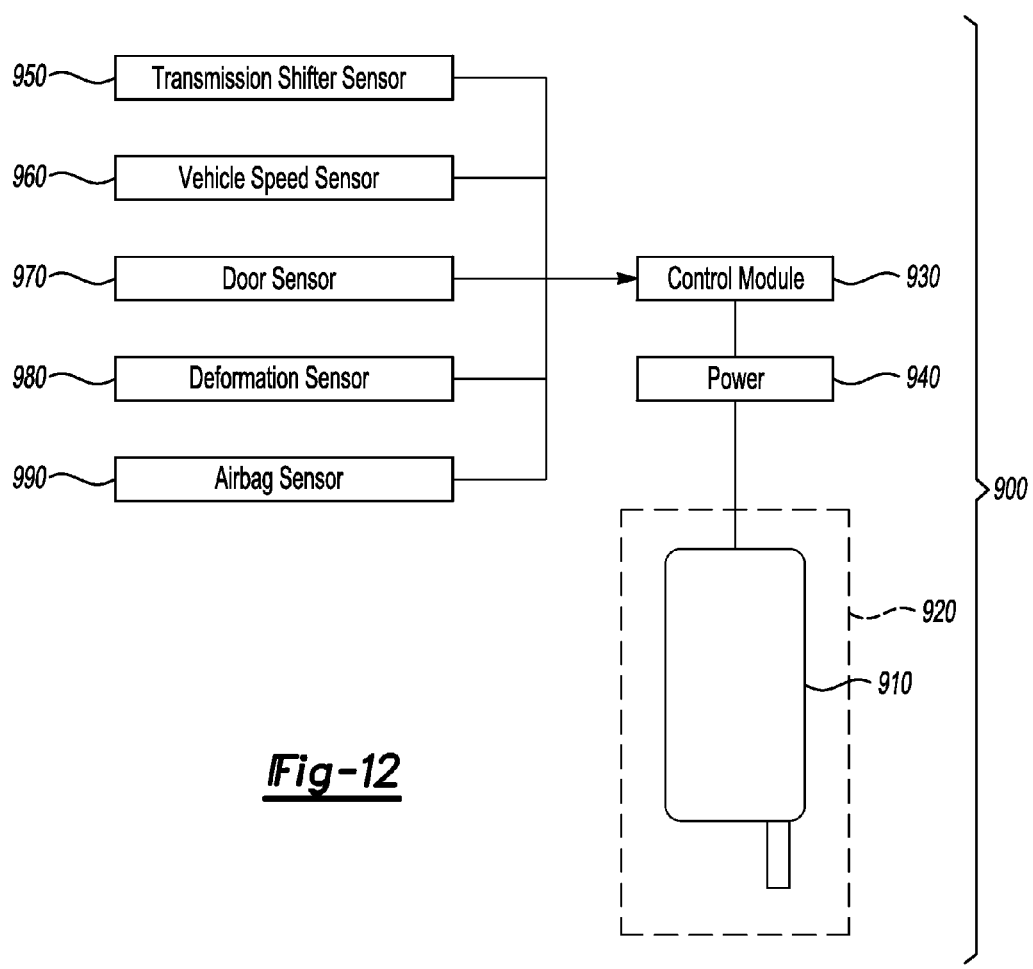
FIG. 12 is a schematic diagram of a control circuit for a structural reinforcement system according to another exemplary embodiment of the present invention.

The latching systems disclosed herein are configured to lock crossbeams to a respective vehicle structural member under preselected conditions. FIG. 12 illustrates a control circuit 900 for use with any of the disclosed vehicle structural reinforcement systems. The control circuit 900 includes an actuator 910 in a latching system 920 configured to selectively lock a crossbeam to a vehicle structural pillar or floor rocker. In this example, actuator 910 is a linear actuator configured to move a pin vertically, or along the Z-axis. Actuator can also be, for example, a rotational actuator.

A control module 930 is indirectly linked to the actuator 910 through a power source 940, as shown in FIG. 12. Control module 930 includes a switch to selectively apply power to the actuator 910. In this embodiment, the control module 930 is linked to various sensors 950, 960, 970, 980, and 990 configured to determine a vehicle performance condition.

Control module 930 is linked to a transmission shifter sensor 950. Transmission shifter sensor 950 is configured to send a signal to the control module 930 indicative of what mode of operation the transmission is operating in. In this arrangement, when the transmission is operating in a drive gear higher than $1^{st}$ gear the control module 930 supplies power to the actuator 910 to activate the vehicle structural support system. Accordingly, when the vehicle is operating at lower speeds, i.e., in first gear or reverse, the system is inactive and the power supply to the actuator 910 is cut off. The latching system components are disengaged. In other arrangements, the control module 930 can utilize a different preselected transmission condition to determine when to engage the latching system components (e.g., when the vehicle transmission is operating in any drive gear).

As shown in FIG. 12, control module 930 is linked to a vehicle speed sensor 960. Vehicle speed sensor 960 is configured to send a signal to the control module 930 indicative of whether a threshold vehicle speed has been obtained. In this arrangement, when the vehicle is driving faster than five miles per hour the control module 930 supplies power to the actuator to activate the vehicle structural support system. Accordingly, when the vehicle is operating at lower speeds, i.e., the system is inactive and the power supply 940 to the actuator is cut off. The latching system components are disengaged and the door can be opened. In other arrangements, the control module 930 can utilize a different preselected condition to determine when to engage the latching system components (e.g., when the vehicle is in motion).

Control module 930 is linked to a door sensor 970 as shown in FIG. 12. Door sensor 970 is configured to send a signal to the control module 930 indicative of whether the vehicle door is opened or closed. In this arrangement, when the door is ajar the control module 930 supplies power to the actuator 910 to activate the vehicle structural support system. Accordingly, when the door is open the system is inactive and the power supply 940 to the actuator 910 is cut off. The latching system components are disengaged.

Control module 930, as shown in FIG. 12, is linked to a deformation sensor 980. Deformation sensor 980 sends a signal to the control module 930 indicative of a sensed impact condition. In this arrangement, when a predetermined about of deformation in the vehicle door is sensed the control module 930 supplies power to the actuator 910 to activate the vehicle structural support system. The system is inactive until a crash condition is sensed and the power supply to the actuator 910 is cut off. The latching system components are disengaged.

Control module 930 is linked to an airbag sensor 990. Airbag sensor 990 is configured to send a signal to the control module 930 indicative of whether the airbag has been initiated. In this arrangement, when the airbag is deployed or deploying the control module 930 supplies power to the actuator 910 to activate the vehicle structural support system. Until the airbags are triggered, the system is inactive and the power supply to the actuator 910 is cut off. The latching system components are disengaged.

Control module 930 can be configured to respond to any one of the aforementioned exemplary preselected conditions or the control module can respond to all of the preselected conditions. For example, either a vehicle speed higher than a predetermined threshold or an airbag deployment could activate the system. It should be appreciated that other preselected conditions can be programmed into the control module 930.

Power supply 940 can be linked to the vehicle's main electric power supply or be any type of secondary battery or capacitor. In the case of power loss a back-up capacitor for the restraint control system can be utilized by the control circuit 900.

A method of manufacturing a vehicle structural reinforcement system is also disclosed herein. The method of manufacture includes the following steps: forming a first pillar (e.g., the A-, B- or C-pillar 50, 60 or 70 as shown in FIG. 1); forming a second pillar (which can similarly be the A-, B- or C-pillars); forming a crossbeam (e.g., 140); attaching the crossbeam to a vehicle door 100; attaching the crossbeam 140 to the first pillar; incorporating a latching system (e.g., 160) in the crossbeam and second pillar configured to selectively lock the crossbeam to the second pillar; and configuring the latching system to activate under preselected conditions. The vehicle structural pillars can be formed using available manufacturing techniques such as, e.g., molding, stamping, welding, lathing, milling or any other forming technique available in the art. Attaching the crossbeam to the vehicle door can be accomplished, for example, through welding, using fasteners, integrally forming with or press-fitting the crossbeam thereto. Attaching the crossbeam to the first pillar or A-pillar can be accomplished by hinging the vehicle door with respect to the A-pillar (as shown for example in FIG. 2).

Incorporating a latching system includes attaching latching system components to any one of the vertical structural pillars or floor rockers as well as the crossbeam. For example, as shown in FIGS. 3 and 4, a locking hinge can be attached to the B-pillar to incorporate the latching system in the B-pillar. A matable end (or hooked end) can then be formed in the crossbeam to incorporate a portion of the latching system therein, as also shown in FIGS. 3-4. Any latching system compatible with the disclosed method can include a sensor—e.g., 970 as discussed with respect to FIG. 12—configured to indicate when a preselected condition is met, e.g., the vehicle door being closed. In other embodiments, latching system can also include a purely mechanical means for assessing whether the door is closed or ajar.

In one embodiment, the method includes incorporating an anti-rotation device (e.g., 420 as discussed with respect to FIG. 8) in the latching mechanism. The anti-rotation device reduces rotation of the crossbeam with respect to the vertical axis of the vehicle—i.e., the Z-axis. Incorporating the anti-rotation device can involve forming the device into existing latching system structure (e.g., manufacturing a dual prong arrangement as shown in FIG. 8) or merely assembling the device into or along with other latching system components.

In another embodiment, a method of reinforcing a vehicle door is employed. The method includes the steps of: attaching a crossbeam (e.g., 650) to a vehicle door (630 as shown in FIG. 11); attaching the crossbeam to a first pillar (e.g., 740); incorporating a latching system (e.g., 760) in the crossbeam and a second pillar (e.g., 750) configured to selectively lock the crossbeam to the second pillar; and configuring the latching mechanism to activate under preselected conditions. The method integrates the vehicle pillars so as to bolster the structural integrity of the side door in side impact situations. As discussed, attaching the crossbeam to the vehicle door can be accomplished, for example, through welding, using fasteners, integrally forming with or press-fitting the crossbeam thereto. Attaching the crossbeam to the first pillar or A-pillar can be accomplished by hinging the vehicle door with respect to the A-pillar (as shown for example in FIG. 2). Incorporating a latching system includes attaching latching system components to any one of the vertical structural pillars or floor rockers as well as the crossbeam. For example, as shown in FIGS. 5-6, a movable pin can be attached to the B-pillar to incorporate the latching system in the B-pillar. A matable end (or apertures) can then be formed in the crossbeam to incorporate a portion of the latching system therein, as also shown in FIGS. 5-6. Any latching system compatible with the disclosed method can include a sensor—e.g., 960 as discussed with respect to FIG. 12—configured to indicate a preselected condition such as a vehicle speed higher than a preselected threshold.

Crossbeam can be manufactured using molding, stamping, welding, lathing, milling or any other forming technique available in the art. Crossbeams, sometimes commonly referred to as "Benteler beams," are configured to only deform when in tension. In the shown embodiment, the crossbeams are oriented to be mainly horizontal to reduce the length of the beams, which reduces the time it takes to put the beams in tension. In other embodiments, the crossbeams include pins that engage a bracket on the vehicle structural pillars or floor rocker to lock thereto. Various other mating geometries can be employed to anchor the crossbeam to the structural pillars or floor rocker.

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A vehicle structural reinforcement system, comprising:
   a first pillar;
   a second pillar;
   a vehicle door between the first and second pillars;
   a first crossbeam attached to the door; and
   a first latching system configured to selectively lock the first crossbeam to the second pillar under a preselected condition;
   wherein the first latching system comprises an anti-rotation device configured to reduce rotation of the first crossbeam with respect to a vertical axis.

2. The reinforcement system of claim 1, further comprising:
   a second latching system configured to selectively lock the crossbeam in the first pillar.

3. The reinforcement system of claim 1, wherein the preselected condition for activation of the first latching system is the vehicle door being closed.

4. The reinforcement system of claim 1, wherein the preselected condition for activation of the first latching system is a vehicle speed exceeding a threshold.

5. The reinforcement system of claim 1, wherein the first pillar is an A-pillar, B-pillar or C-pillar.

6. The reinforcement system of claim 1, wherein the second pillar is an A-pillar, B-pillar or C-pillar.

7. The reinforcement system of claim 1, wherein the anti-rotation device includes a plurality of prongs configured to engage the first crossbeam.

8. The reinforcement system of claim 1, wherein the latching system includes an actuator configured to move the anti-rotation device into engagement with the first crossbeam when the first latching system is activated.

9. The reinforcement system of claim 1, further comprising:
   a second crossbeam attached to the door; and
   a second latching system configured to selectively lock the second crossbeam to a floor rocker.

10. The reinforcement system of claim 9, wherein the second crossbeam is attached to the first crossbeam.

11. A vehicle structural reinforcement system, comprising:
a pillar;
a floor rocker attached to a vehicle floor;
a crossbeam extending between the pillar and the floor rocker; and
a latching system configured to selectively lock the crossbeam to the floor rocker;
wherein the latching system includes:
anti-rotation device configured to reduce rotation of the crossbeam with respect to a vertical axis.

12. The reinforcement system of claim 11, wherein the latching system includes an actuator configured to move the anti-rotation device into engagement with the crossbeam when the latching system is activated.

13. A method of manufacturing a vehicle structural reinforcement system, comprising:
forming a first pillar;
forming a second pillar;
forming a crossbeam;
attaching the crossbeam to a vehicle door;
incorporating a latching system between the crossbeam and second pillar configured to selectively lock the crossbeam to the second pillar;
configuring the latching system to activate under preselected conditions; and
incorporating an anti-rotation device in the latching system, configured to reduce rotation of the crossbeam with respect to a vertical axis.

14. A method of reinforcing a vehicle door, comprising:
attaching a crossbeam to a vehicle door;
incorporating a latching system between the crossbeam and a second pillar configured to selectively lock the crossbeam to the second pillar;
configuring the latching system to activate under preselected conditions; and
incorporating an anti-rotation device in the latching system, configured to reduce rotation of the crossbeam with respect to a vertical axis.

* * * * *

UNITED STATES PATENT AND TRADEMARK OFFICE
CERTIFICATE OF CORRECTION

PATENT NO. : 8,087,714 B2
APPLICATION NO. : 12/722520
DATED : January 3, 2012
INVENTOR(S) : Stephen William Rouhana, Krish E. Aekbote and Mohamed Ridha Baccouche Page 1 of 1

It is certified that error appears in the above-identified patent and that said Letters Patent is hereby corrected as shown below:

Col. 13, line 11, "anti-rotation device" should read --an anti-rotation device--

Signed and Sealed this
Twenty-eighth Day of February, 2012

David J. Kappos
*Director of the United States Patent and Trademark Office*